Sept. 22, 1931.　　　B. GREENE　　　1,824,132
PRESS
Filed June 23, 1928　　　3 Sheets-Sheet 2

Inventor
Bartholomew Greene
By Harry Frease
Attorney

Sept. 22, 1931.    B. GREENE    1,824,132
PRESS
Filed June 23, 1928    3 Sheets-Sheet 3
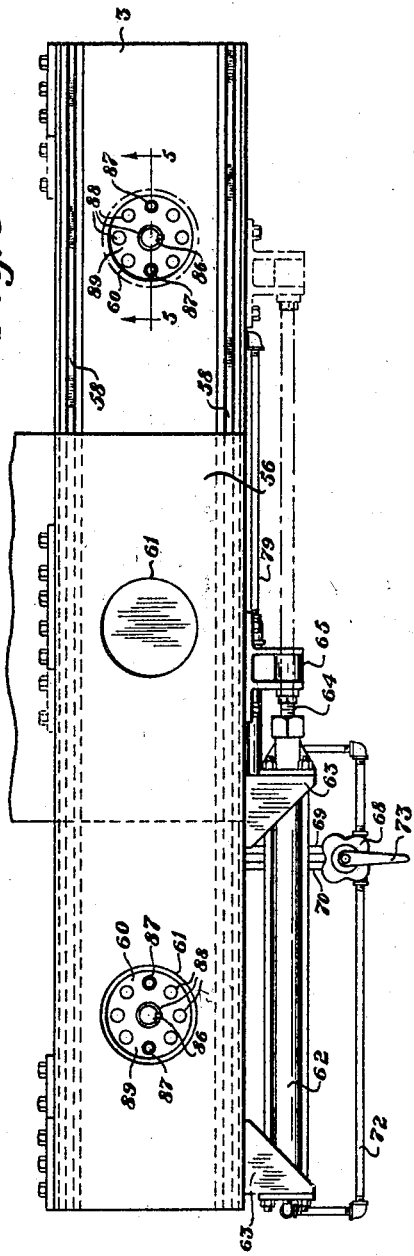
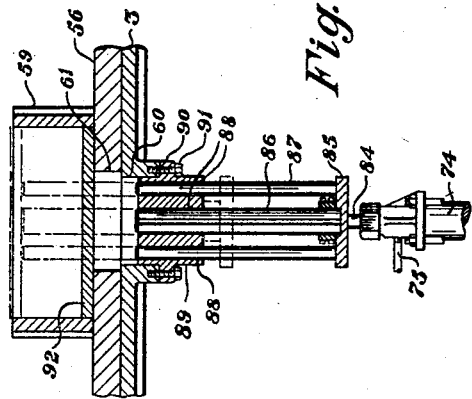
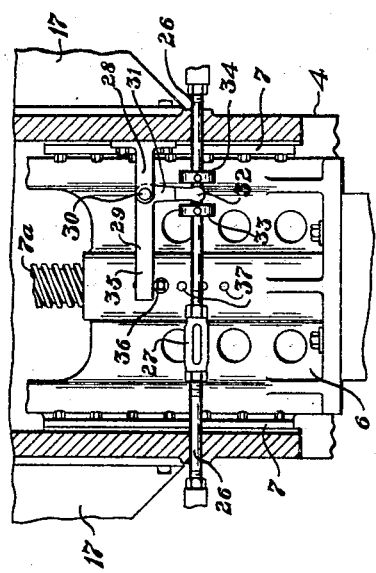
Inventor
*Bartholomew Greene*
By *Harry Frease*
Attorney Patented Sept. 22, 1931

1,824,132

UNITED STATES PATENT OFFICE

BARTHOLOMEW GREENE, OF SEBRING, OHIO

PRESS

Application filed June 23, 1928. Serial No. 287,694.

The invention relates to presses for forming clay products and the objects of the improvement are to provide a press which may be operated more rapidly than the ordinary apparatus used for such purposes; and to provide control mechanism for the press including a brake which automatically stops the reciprocating head as the same reaches a predetermined upward limit of its movement.

The above and other objects may be accomplished by providing a press having a sliding table adapted to carry two molds or dies, one of which may be emptied and refilled while the other is in operative position; and by providing a screw operated friction drive for the reciprocating head with means for manually controlling the reciprocation of the head and automatic means for stopping the head as it reaches the upper limit of its movement.

Figure 1:
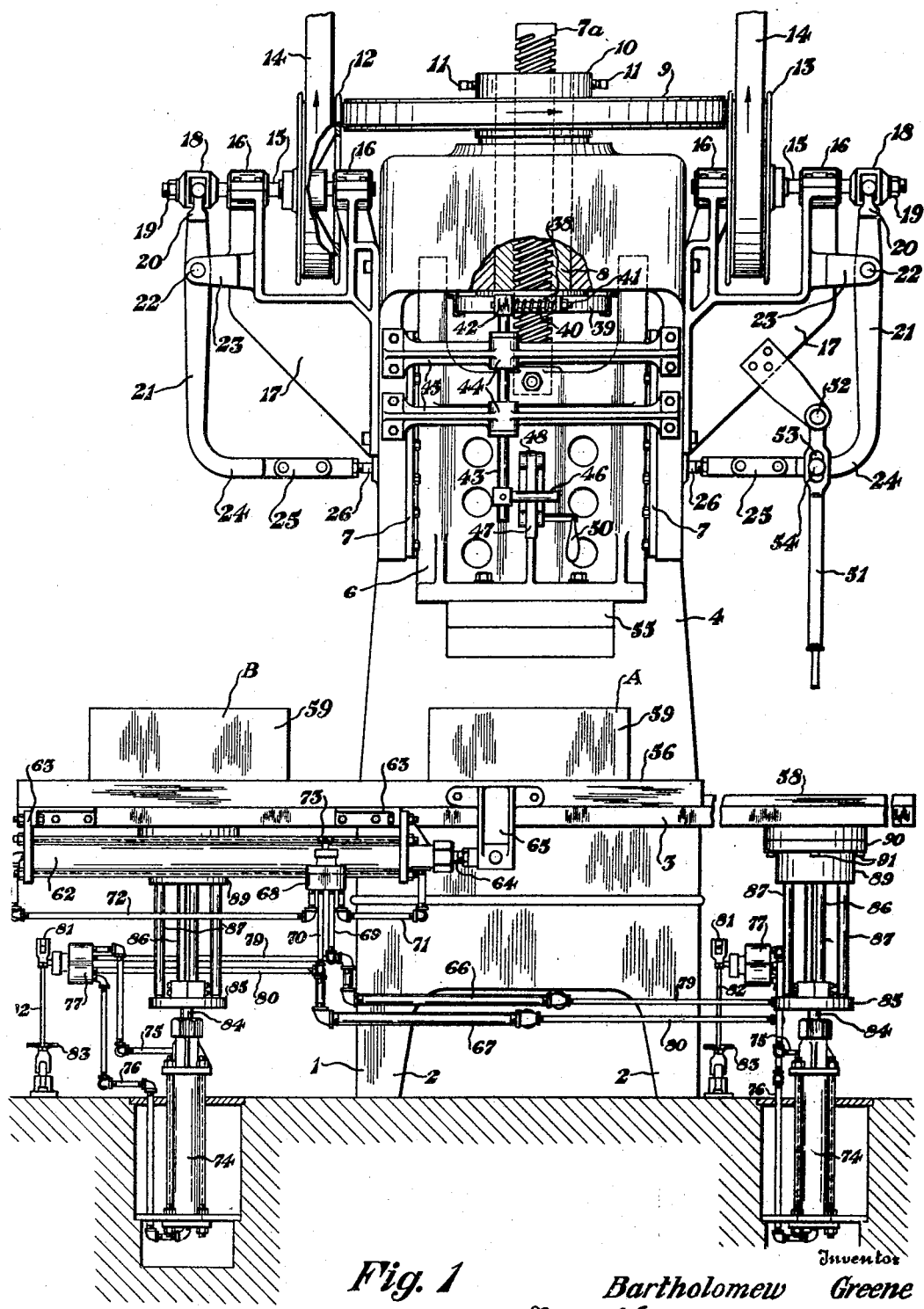
Figure 2:
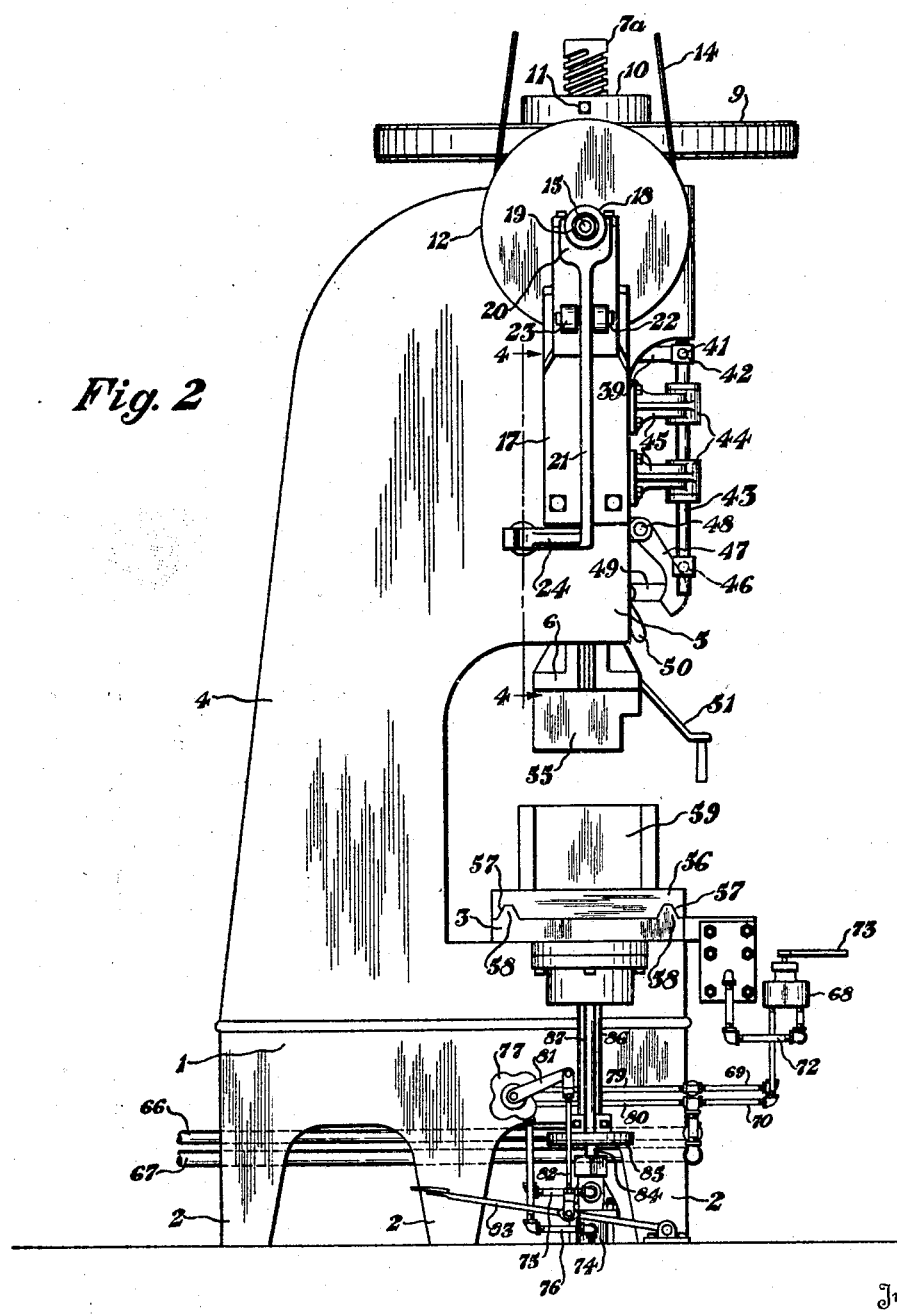

An embodiment of the invention thus set forth in general terms is illustrated in the accompanying drawings, in which Figure 1 is a front elevation of the improved press;

Fig. 2, a side elevation of the same;

Fig. 3, a plan view of the bed and sliding table, showing the molds or dies removed;

Fig. 4, a fragmentary detail section taken substantially on the line 4—4, Fig. 2; and Fig. 5, a fragmentary detail section taken substantially on the line 5—5, Fig. 3.

Similar numerals refer to similar parts throughout the drawings.

The press may be mounted upon a base 1 having the legs 2 and the bed 3 and the housing 4 supported thereon. The upper portion of the housing overhangs the bed as shown at 5.

The reciprocating head 6 is slidably mounted between the guides 7. This reciprocating head has a screw 7a fixed to its upper end, said screw extending through the tubular nut 8 which is journaled in the upper portion of the housing.

For the purpose of rapidly reciprocating the head by means of the nut, the threads upon the screw and the nut may be triple threads as shown.

The friction disk 9 may be fixed upon the upper end portion of the nut as by the hub 10 and screws 11. This friction disk is adapted to be alternately engaged by the friction pulleys 12 and 13 which are located diametrically opposite to each other and arranged to be driven by any suitable means such as the belts 14.

Each of these friction pulleys is fixed upon a shaft 15 journaled in bearings 16 upon the brackets 17, the shafts being mounted for longitudinal sliding movement within the bearings.

A sleeve 18 is journaled upon the end portion of each shaft, being prevented from being entirely removed therefrom as by the nut or collar 19. Each sleeve is engaged by a yoke 20 upon the upper end of a lever 21, said levers being pivoted as at 22 to the ears 23 formed upon the brackets 17.

The lower end of each lever 21 may be bent inward and rearward as at 24 and connected as by the link 25 with the adjacent end of the rod 26 slidably located through the housing. For the purpose of adjustment the rod 26 may be formed in two sections provided with a turn buckle 27 or the like for connecting the same together.

A bracket 28 may be fixed to one inner wall of the housing and a bell crank 29 may be pivoted thereon as at 30. The depending arm 31 of the bell crank is provided with a yoke 32 straddling the rod 26 between the spaced collars 33 and 34. The substantially horizontal arm 35 of the bell crank is normally held out of engagement with the pin 36, in the reciprocating head, by means of the collar 34. This pin 36 may be placed in any one of the series of apertures 37 as desired.

A brake drum 38 is fixed upon the lower end portion of the nut 8 and surrounded by the brake band 39 the ends of which are normally held apart by means of the coil spring 40. This spring surrounds the rod 41 located through the spaced adjacent ends of the brake band. A block 42 is fixed upon one end of the brake band and a cam is mounted therein upon the cam shaft 43 for engaging the rod 41 and pulling the same against the pressure of the spring 40 in order to draw the brake band tightly around the brake drum.

This cam shaft is journaled through bearings 44 mounted upon the brackets 45 supported upon the housing and has a finger 46 fixed upon its lower end portion. This finger is adapted to be engaged by the cam 47 pivoted as at 48 upon the reciprocating head and normally held in the position best shown in Fig. 2 by means of the pivoted ear 49. This ear is provided with a handle 50 which may be raised in order to move the ear upward, permitting the cam 47 to drop out of the path of the finger 46.

For the purpose of slidably moving the shafts 15 in order to bring one or the other of the pulleys 12 or 13 into engagement with the friction disk, a lever 51 may be pivoted as at 52 upon one of the brackets 17 and provided with the slot 53 engaging a stud 54 upon the adjacent lever 21.

The die 55 is carried by the reciprocating head and adapted to cooperate with one of the lower dies or molds to be hereinafter described. This die may be of any suitable shape depending upon the article to be formed in the mold. In the present case the die is designed for forming the back walls of radiant gas heaters.

A table 56 is slidably mounted for longitudinal reciprocation upon the bed 3, being preferably provided with the grooves 57 for slidable engagement with the guide ribs 58 upon the bed. This sliding table is adapted to carry the spaced pair of molds or dies 59, one of which is located near each end portion of the table.

These molds are so positioned upon the table that when one mold is located beneath the upper die, as shown at A in Fig. 1 the other mold is positioned beyond the housing as shown at B in said figure.

The bed 3 is provided at points near each end with the openings 60 and the table 56 is provided beneath each mold with an opening 61 adapted to register with one of the openings 60 when the table is reciprocated to one extreme or other of its movement.

For the purpose of reciprocating the table upon the bed a fluid operated cylinder 62 may be supported from one side of the bed as by brackets 63 and provided with a piston rod 64 connected to a bracket 65 attached to the table 56.

Pipes 66 and 67 respectively lead from and to a fluid pump or the like for supplying fluid pressure to the cylinder 62 and the other cylinders to be later described. A reversing valve 68 is provided for controlling the operation of the cylinder 62 and is connected by pipes 69 and 70 with the supply and return pipes 66 and 67 respectively.

A pipe 71 connects the reversing valve with the feed end of the cylinder 62 and a similar pipe 72 connects the reversing valve with the return end of the cylinder. The reversing valve may be operated as by the handle 73.

With the valve turned to one position, fluid under pressure from the pipe 66 will be passed through the pipe 69, reversing valve 68 and pipe 72, to the rear end of the cylinder, forcing the piston outward, while fluid from the forward end of the cylinder will be exhausted through the pipe 71, reversing valve and pipe 70, to the return pipe 67.

When the valve 68 is reversed, fluid under pressure will be admitted from the pipe 66 through the pipe 69 and reversing valve and pipe 71 to the forward end of the cylinder, forcing the piston backward therein while the fluid from the rear end of the cylinder will be exhausted through the pipe 72, reversing valve and pipe 70, to the return pipe 67.

A vertically arranged fluid cylinder 74 is located below each of the openings 60 in the bed. Each of these cylinders is connected by pipes 75 and 76, leading from the upper and lower ends respectively of the cylinder, with a reversing valve 77 similar to the valve 68. Each reversing valve is connected by pipes 79 and 80 with the fluid supply and return pipes 66 and 67 respectively, and a handle or lever 81 is provided upon each reversing valve and connected, as by the link 82, with a pedal 83 whereby the valves may be independently operated by foot power.

The piston or plunger 84 of each cylinder 74 carries a disk 85 at its upper end on which may be mounted the central rod 86 and any desired number of rods 87 located near the peripheral portion of the disk. These rods are slidably located through bearing openings 88 in a bearing block 89 fixed within the adjacent opening 60 of the bed as by the peripheral flange 90 and bolts 91.

When the sliding table 56 is moved to a position to bring either of the molds 59 over the corresponding opening 60 in the bed, the corresponding cylinder 74 may be operated to raise the piston, sliding the rods 86 and 87 upward through the opening 61 and raising the removable bottom wall 92 of the mold, as indicated in broken lines in Fig. 5, thus raising the finished molded clay product out of the mold so that the same may be easily removed therefrom by hand.

Assuming the machine to be in the position shown in Fig. 1, the operation is as follows: The mold 59, indicated at A and located in the center of the bed, beneath the reciprocating head, has already been filled with the proper amount of plastic clay. In order to form the same the lever 51 is moved toward the right, sliding the pulley shafts 15 longitudinally in the reverse direction and bringing the friction pulley 13 into frictional contact with the friction disk 9, causing the same to rotate in the direction of the arrow shown in said figure.

This rotation of the friction disk rotates the nut 8 in the same direction, moving the head 6 downward until the upper die 55, carried thereby, enters the mold 59, which is positioned below the same, forming the clay in the mold into the proper shape. As the die reaches the lower limit of its movement, the lever 51 is moved to the left, bringing the friction pulley 13 out of engagement with the disk 9 and moving the pulley 12 into engagement with the disk, causing the same to rotate the nut in the opposite direction, raising the head to the initial position.

In the event the operator neglects to throw the lever 51 to the neutral position as the head is moved upward, the cam 47 will engage the finger 46 upon the shaft 43, rotating the shaft to apply the brake 39. At the same time the pin 36, upon the head, will engage the horizontal arm 35, of the bell crank 29, sliding the rod 26 into position to move the pulley 12 out of engagement with the friction disk 9, stopping the rotation of the nut 8.

During this operation the other mold 59, in the position shown at B in Fig. 1, has been filled with the proper amount of plastic clay. The reversing valve 68 is then operated to slide the table 56 to the right until the mold B is moved to the position beneath the reciprocating head while the mold A is moved to a position directly above the opening 60 at the right hand end of the bed.

Then, while the head is being operated, as above described, to form the article in the mold B, the right hand reversing valve 77 is operated, by its pedal, to raise the piston 84 of the right hand cylinder, bringing the rods 86 and 87 upward into the broken line position shown in Fig. 5 and raising the removable bottom wall 92 of the mold A to the broken line position shown in said figure.

The finished article on this removable bottom wall may then be lifted off and the piston 84 lowered to normal position. The proper amount of plastic clay is then placed in the mold A and the reversing valve 68 is operated to move the table back to the position shown in Fig. 1. The left hand cylinder 74 is then operated, through its reversing valve, to remove the molded article from the mold B, and a new supply of plastic clay is placed in said mold and the operation continued as above described.

I claim:

1. A press including a reciprocating head, a die carried by the head, a bed below the head, a table slidably mounted upon the head, a pair of spaced molds carried by the table, means for moving the table upon the bed to alternately position the molds directly beneath the die, a movable bottom in each mold carried by the table and means for raising the bottom of each mold while the other mold is positioned beneath the die.

2. A press including a reciprocating head, a die carried by the head, a bed below the head, a table slidably mounted upon the bed, a pair of spaced molds carried by the table, means for moving the table upon the bed to alternately position the molds directly beneath the die, a movable bottom in each mold carried by the table and a plunger for raising the bottom of each mold while the other mold is positioned beneath the die.

3. A press including a reciprocating head, a die carried by the head, a bed below the head, a table slidably mounted upon the bed, a pair of spaced molds carried by the table, means for moving the table upon the bed to alternately position the molds directly beneath the die, a movable bottom in each mold carried by the table and a fluid operated cylinder for raising the bottom of each mold while the other mold is positioned beneath the die.

4. A press including a reciprocating head, a screw fixed to the head, a nut rotatable upon the screw, a friction disk fixed upon the nut, driven friction pulleys located at diametrically opposite points around the periphery of the disk, means for alternately moving said pulleys into frictional engagement with the disk, a brake drum fixed upon the nut and a brake band surrounding said drum, and means for manually operating the brake band and drum to stop the reciprocating head in any desired position.

5. A press including a reciprocating head, a screw fixed to the head, a nut rotatable upon the screw, a friction disk fixed upon the nut, driven friction pulleys located at diametrically opposite points around the periphery of the disk, means for alternately moving said pulleys into frictional engagement with the disk, a brake drum fixed upon the nut and a brake band surrounding said drum, means for manually operating the brake band and drum to stop the reciprocating head in any desired position, and means for automatically tightening the band upon the drum as the head reaches a predetermined position.

6. A press including a reciprocating head, a screw fixed to the head, a nut rotatable upon the screw, a friction disk fixed upon the nut, driven friction pulleys located at diametrically opposite points around the periphery of the disk, means for alternately moving said pulleys into frictional engagement with the disk, a brake drum fixed upon the nut, a brake band surrounding the drum, a cam on the head, means operated by the cam and connected with the brake band for automatically tightening the band upon the drum as the head reaches a predetermined position, and means for manually operating the brake band and drum to stop the reciprocating head in any desired position.

7. A press including a reciprocating head, a die carried by the head, a bed below the head, a table slidably mounted upon the bed, a pair of spaced molds carried by the table, there being openings in the table below each mold, there being spaced openings in the bed, means for moving the table upon the bed to alternately position one of the molds directly beneath the die and the other mold and table opening thereunder directly over one of the bed openings, and means operating through the aligned bed and table openings for removing a molded article from one mold while the other mold is positioned beneath the die.

8. A press including a reciprocating head, a die carried by the head, a bed below the head, a table slidably mounted upon the bed, a pair of spaced molds carried by the table, there being openings in the table below each mold, there being spaced openings in the bed, means for moving the table upon the bed to alternately position one of the molds directly beneath the die and the other mold and table opening thereunder directly over one of the bed openings, and a plunger operating through the aligned bed and table openings for removing a molded article from one mold while the other mold is positioned beneath the die.

In testimony that I claim the above, I have hereunto subscribed my name.

BARTHOLOMEW GREENE.